(12) United States Patent
Jecha et al.

(10) Patent No.: US 6,631,375 B2
(45) Date of Patent: *Oct. 7, 2003

(54) ADMINISTRATION AND SEARCH AND REPLACE OF COMPUTERIZED PREPRESS

(75) Inventors: Steven T. Jecha, Minneapolis, MN (US); Winfield A. Mitchell, Minneapolis, MN (US)

(73) Assignee: VistaPrint Limited, Hamilton (BM)

( * ) Notice: Subject to any disclaimer, the term of this patent is extended or adjusted under 35 U.S.C. 154(b) by 16 days.

This patent is subject to a terminal disclaimer.

(21) Appl. No.: 09/204,388

(22) Filed: Dec. 2, 1998

(65) Prior Publication Data

US 2002/0059235 A1 May 16, 2002

Related U.S. Application Data

(63) Continuation-in-part of application No. 08/982,438, filed on Dec. 2, 1997, now abandoned.

(51) Int. Cl.[7] .............................................. G06F 17/30
(52) U.S. Cl. .......................... 707/9; 707/100; 715/517; 715/530
(58) Field of Search ................................ 707/501, 506, 707/530, 517, 5, 7, 9, 100, 501.1; 345/435, 603, 604; 715/501.1, 506, 517, 530

(56) References Cited

U.S. PATENT DOCUMENTS

| | | | | | |
|---|---|---|---|---|---|
| 5,752,053 A | * | 5/1998 | Takakura et al. | ............ | 345/636 |
| 5,790,790 A | * | 8/1998 | Smith et al. | ................. | 709/206 |
| 5,825,986 A | * | 10/1998 | Ferguson | .................... | 358/1.9 |
| 5,848,413 A | * | 12/1998 | Wolff | .......................... | 707/10 |
| 5,870,552 A | * | 2/1999 | Dozier et al. | ................ | 709/219 |
| 5,892,909 A | * | 4/1999 | Grasso et al. | ................ | 709/201 |
| 5,963,641 A | * | 10/1999 | Crandall et al. | ................ | 380/2 |
| 5,995,723 A | * | 11/1999 | Sperry et al. | .............. | 358/1.15 |
| 6,020,894 A | * | 2/2000 | Silverbrook | ................ | 345/433 |

FOREIGN PATENT DOCUMENTS

| | | | | | |
|---|---|---|---|---|---|
| EP | 475601 A2 | * | 3/1992 | ........... | G06T/11/60 |
| EP | 674277 | * | 9/1995 | ........... | G06F/17/21 |
| EP | 689157 | * | 12/1995 | .......... | G06K/15/00 |

OTHER PUBLICATIONS

Edwards, Stephen; Kingsley, Lawrence; Votsch, Victor; Walter, Mark; "Roll over, Guetnbers: how the Wev is changing printing"; Sep. 1997; Seybold Report on Internet Publishing; V2, N1, pp. 1–18.*

Grayson, S., et al., "Adobe Print Publishing Guide", *Adobe Systems Incorporated*, Entire Manual, (1993–1995).

* cited by examiner

*Primary Examiner*—Vincent Millin
*Assistant Examiner*—Ella Colbert
(74) *Attorney, Agent, or Firm*—Robert Dulaney

(57) ABSTRACT

Computerized client/server prepress using a downloadable document authoring program. A server has stored thereon a document authoring program. The program is adapted to download to a client computer and run in the browser of the client computer. The authoring program allows the client to create an electronic document, view the document in WYSIWYG form, and upload the created document to the server for subsequent translation to a suitable prepress format.

44 Claims, 20 Drawing Sheets

Division/Dept.: [_____] ⌣ 512
Address: [_____] ⌣ 514
Suite/Number: (optional) [_____] ⌣ 516
City: [____] ⌣ 518
State: [_] ⌣ 520
Zip/Postal Code: [____] ⌣ 522
Email: [_____] ⌣ 524
Email Format: finitial.last@globalins.com Please Fill in your Telephone numbers. Leave fields blank that do not apply.

Name: | Number:
--- | ---
Telephone ▼ | (___) ___-____ Ext: ____
Fax ▼ | (___) ___-____ Ext: ____
empty ▼ | (___) ___-____ Ext: ____
empty ▼ | (___) ___-____ Ext: ____

526

[Preview Card]
528

(Preview Card)

|              | Name:                    | Number:                           |
|--------------|--------------------------|------------------------------------|

Telephone  (123) 456-7890 Ext:
Fax  (123) 456-0000 Ext:
empty  ( )   -    Ext:
empty  ( )   -    Ext:

ORDER & SHIPPING INFORMATION    PREVIEW
                                    ↑
                                    528

Number of Cards: 250

Type:
● Normal Inter-Office Delivery
○ UPS 2nd Day Air
○ UPS Next Day Air

Deliver to:
● Address on Business Cards.
○ Alternative Address shown below.

First Name:
Last Name:
Address:
Address:
Suite/Number:
City:
State:
Zip/Postal Code:

VERIFICATION INFORMATION

Cost Center:
Employee I.D.#:

(Finish)

ADMINISTRATION AND SEARCH AND REPLACE OF COMPUTERIZED PREPRESS

RELATED APPLICATIONS

This application is a continuation-in-part to the and coassigned application entitled "Computerized Prepress," filed Dec. 2, 1997, Ser. No. 08/982,438 now abandoned, which is hereby incorporated by reference.

FIELD OF THE INVENTION

This invention relates generally to print and print-publishing prepress, and more particularly to such prepress that is computerized.

BACKGROUND OF THE INVENTION

The publishing process typically requires several steps to successfully complete a printed publication. Such steps include planning and organizing, design and content development, and prepress tasks where electronic files are prepared to be reproduced with ink on paper. Broadly speaking, prepress involves the preparation of all the electronic files that will be utilized to create a publication printed with paper and ink. For a professional publication, this usually involves utilizing an authoring program to create the electronic version of the publication itself, and then using another program (which may be a component of the authoring program), to translate this electronic version into a format from which paper and ink copies of the publication can be printed.

Portions if not all of the prepress process is difficult for non-professionals to accomplish, however. While tools such as Adobe PageMaker and Quark Express enable professionals to more easily create professional-looking documents, most non-professionals find these computer programs overly complex and difficult to use. That is, although the computers sitting on the desks of such non-professionals are sufficiently powerful to handle such tasks, the users themselves may not be sufficiently knowledgeable to perform them. Furthermore, even for experienced professionals, the prepress process is fraught with uncertainty; for example, the professional must know the type of paper and ink output that is desired a priori before translating an electronic version of a document into a format from which paper and ink copies can be printed. That is, even for experienced professionals, the prepress process is not tightly integrated enough to attain fast, easy and cost-effective print publishing.

SUMMARY OF THE INVENTION

The above-identified shortcomings as well as other shortcomings and problems are addressed by the present invention, which will be understood by reading and studying the following specification. In one embodiment, a computerized prepress system includes four components: a server, a first client, a second client, and a printer. The server has stored thereon an authoring program to create a document template, and a translation program to translate a document based on the document template to a suitable prepress format. The first client downloads the authoring program from the server to create the document template, and then uploads the document to the server. The second client creates the document based on the document template, which is uploaded to the server for translation to the suitable prepress format. The printer receives the document as translated to the suitable prepress format from the server, such that the printer may then print copies of the document.

More specifically, in one particular embodiment of the invention, the authoring program is written in the programming language Java, and the client, server and printer are each connected to an intranet the Internet. Thus, an administrative user at the client needs only to run a web browser program, such as Netscape Navigator, to access the server and download and run the authoring program. This user creates a document template. Another user then can use a web browser program to create a document based on the template. The server may then as required translate the document into a suitable prepress format—such as PostScript—and send it to the printer (e.g., as a MIME-compliant electronic mail) for printing.

In different embodiments of the invention, computerized methods, computerized systems, computers, and computer-readable media of varying scope are described. Still other and further embodiments, aspects and advantages of the invention will become apparent by reference to the drawings and by reading the following detailed description.

BRIEF DESCRIPTION OF THE DRAWINGS

FIGS. 4a–4m are diagrams of screens displayed on a display device of a computer in conjunction with one embodiment of the invention; and, FIGS. 5a–5d are diagrams of screens displayed on a display device of a computer in conjunction with one embodiment of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
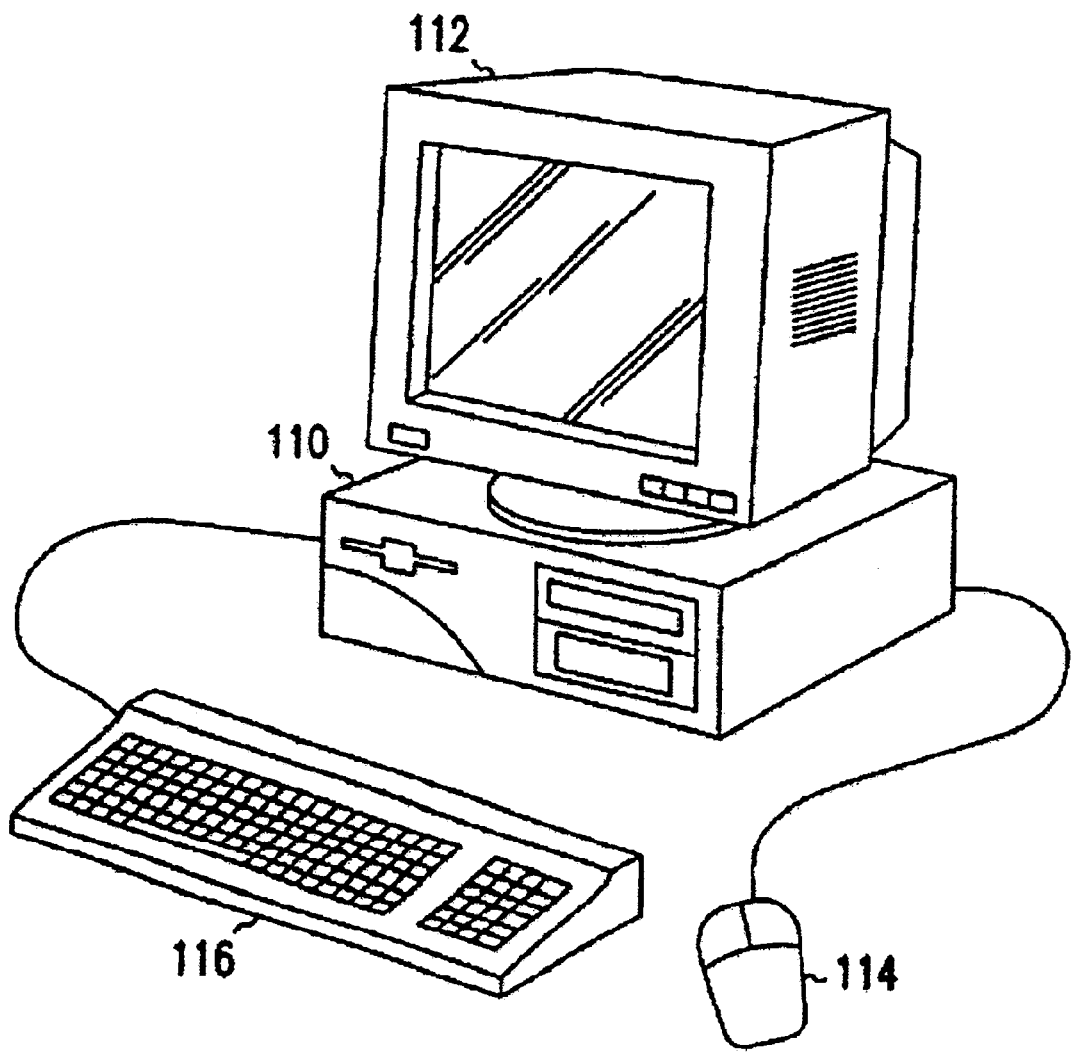
FIG. 1 is a diagram of a computer in conjunction with which embodiments of the invention may be implemented.

Referring first to FIG. 1, a diagram of a computer in conjunction with which embodiments of the invention may be implemented is shown. Computer 110 is operatively coupled to display device 112, pointing device 114, and keyboard 116. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The hard drives and floppy disks are more specifically types of nonvolatile store media. Computer programs running on the computer are executed by the processor from the computer-readable media. The invention is not particularly limited to any type of computer 110. Computer 110 preferably is a PC-compatible computer or a MacOS-compatible computer. The construction and operation of such computers are well known within the art.

Furthermore, computer 110 may be communicatively connected to the Internet via a communication device, any particular manner by which the invention is not limited to, and which is not shown in FIG. 1. Internet connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card to connect to a local-area network (LAN) that itself is connected to the Internet via what is know in the art as a "direct connection" (e.g., T1 line, ect.).

Computer 110 also has at least one operating environment running thereon, each desirably providing a graphical user interface including a user-controllable pointer. Such operating environments include operating systems such as versions of the Microsoft Windows and Apple MacOS operating systems known in the art. The invention is not limited to any particular operating environment, however, and the construction and use of such operating environments are well known within the art. Computer 110 also desirably has at least one web browser application program running with at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard.

Figure 2:
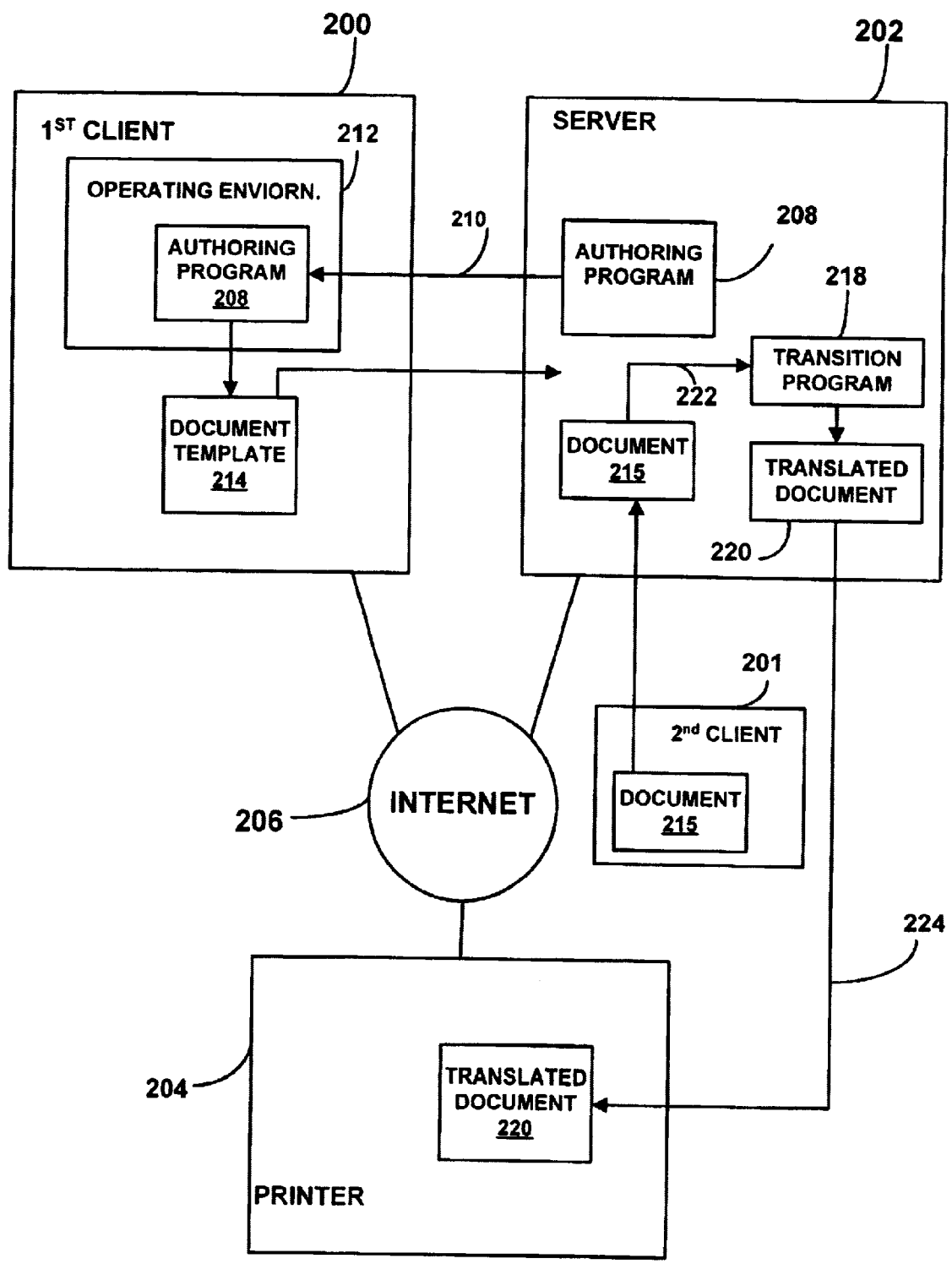
FIG. 2 is a diagram of a computerized prepress system in accordance with one embodiment of the invention.

Referring next to FIG. 2, a diagram of a computerized system in accordance with one embodiment of the invention is shown. Each of first client computer 200, second client computer 201, server computer 202, and printer computer 204 is a computer, such as that shown in and described in conjunction with FIG. 1, although the invention is not so limited. Thus, each of first client computer 200, second client computer 201, server computer 202, and printer computer 204 has a processor, a computer-readable medium from which computer programs are executed by the processor, and a communications device, such as a network card, or a modem. First client computer 200, second client computer 201, server computer 202, and printer computer 204 are communicatively coupled to one another via the Internet 206. Note that in one embodiment, Internet 206 is replaced by an extranet or an intranet, as known within the art, and as may be found in corporate and other environments.

Server computer 202 is desirably an extranet, intranet or Internet world-wide-web server, as known in the art, such that it has assigned thereto a Universal Resource Locator (URL) address to permit client computer 200 and client computer 201, as well as other computers, to access the server. The invention is not particularly limited to a type of server 202. Typical examples include those running software available from Netscape, Microsoft, Apache, NCSA, and others. Server 202 is also not limited to running on a particular operating system (OS); common operating systems including Microsoft Windows 95, Microsoft Windows NT, Apple MacOS and UNIX.

Server computer 202 has stored thereon authoring program 208. Authoring program 208 is downloaded from server 202 by and to client 200 through the Internet 206, although this is more directly represented by arrow 210. Authoring program 208 desirably is run within operating environment 212 running on client 200. Such an operating environment 212 includes those provided by extranet, intranet and Internet world-wide-web browser programs such as Microsoft Internet Explorer and Netscape Navigator. For example, in one embodiment, authoring program 208 is coded in the programming language Java, such that program 208 is a Java applet that is downloaded through the Internet by client 200, and runs within an operating environment 212 that is a browser program that is Java capable. In other embodiments of the invention, authoring program 208 may be coded in the programming language Perl, C, C++, ActiveX, or other programming languages; the invention is not so limited.

Authoring program 208 is used within first client computer 200 to create document template 214. Document template 214 is a document created by the administrative user of computer 200, using authoring program 208. The invention is not limited to any type of authoring program 208; in one embodiment of the invention, authoring program 208 is that which is shown in and will be described in conjunction with FIGS. 4a–4m.

Once document template 214 has been created at first client 200, it is uploaded to server 202 for saving at the server, through the Internet 206. Document template 214 is saved at the server 202 on a non-volatile storage device of the server, such as a hard disk drive. It is saved in an internal file format that maximizes efficiency in the storage of the document.

Furthermore, the second client computer 201 creates the document 215 from the document template 214. It does this by downloading the document 215 from server 202 through the Internet 206. The second client computer also has an operating environment running thereon, not shown in the figure, comparable to the operating environment 212 of the first client computer 200 includes those provided by extranet, intranet and Internet world-wide-web browser programs such as Microsoft Internet Explorer and Netscape Navigator.

The document template 214 may have fixed information, such as logos, images, fonts, and positions of text information, and the logos and images. The document 215 is created in one of at least two ways. First, the user of the second client computer 201 may also download the authoring program, and use it to create the document 215, within the constraints allowed by the document template 214. Second, the user of the second client computer 201 may be queried to submit information for a form having tags corresponding to criteria of the document template 214. For example, the criteria may include the user's first name, last name, phone number, etc. The user types in his or her information corresponding to these criteria. A search and replace is then performed, replacing the criteria with the information entered by the user. The tags of the form indicate which information is to replace which criteria. In one embodiment, the form is an HTML form, which can be modified via a web browsing program as known in the art. As to the use of an authoring program by this (end) user, the authoring program may be as described later in conjunction with FIGS. 4a–4m. As to the use of entering in information into a form by the end user, the entering of information may be as described later in conjunction with FIGS. 5a–5d.

The invention is also not limited to any particular document 214. In one embodiment of the invention, document 214 is a business card; however, other documents amenable to the invention include self-adhesive notes (such as those available from 3M, Inc., as Post-It notes), letterheads, pamphlets, brochures, envelopes, etc.

Once document 215 has been created, it is uploaded to server 202 for saving at the server, through the Internet 206. Document 214 is saved at the server 202 on a non-volatile storage device of the server, such as a hard disk drive. It is saved in an internal file format that maximizes efficiency in the storage of the document. Once the document 215 is ready to be sent to a printer for printing and publication (as may be indicated by client 200 to server 202), server 202 runs translation program 218 on document 215 (program 218 being stored on server 202) as saved in the internal file format to generate a translated document 220, as represented by arrow 222. The translation program 218 translates document 214 into a file format suitable for prepress, such as PostScript. Other file formats suitable for prepress include XML, HTML, PDF, and PostScript extreme, as known within the art. Translation program 218 performs any color separations, or other operations as required by the suitable prepress file format. The invention is not limited to any particular suitable prepress file format.

Server 202 then transmits the translated document 220 through the Internet 206 to printer 204, as more directly represented by arrow 224. In one embodiment, this is accomplished by server 202 attaching the translated document 220 as an attachment file to a MIME-compliant electronic mail, which may then be sent to the electronic mail address of printer 204. However, the invention is not limited to any manner by which such transmission occurs. Once the printer 204 has received the translated document 220, document 220 may then be printed and published as needed.

Figure 3:
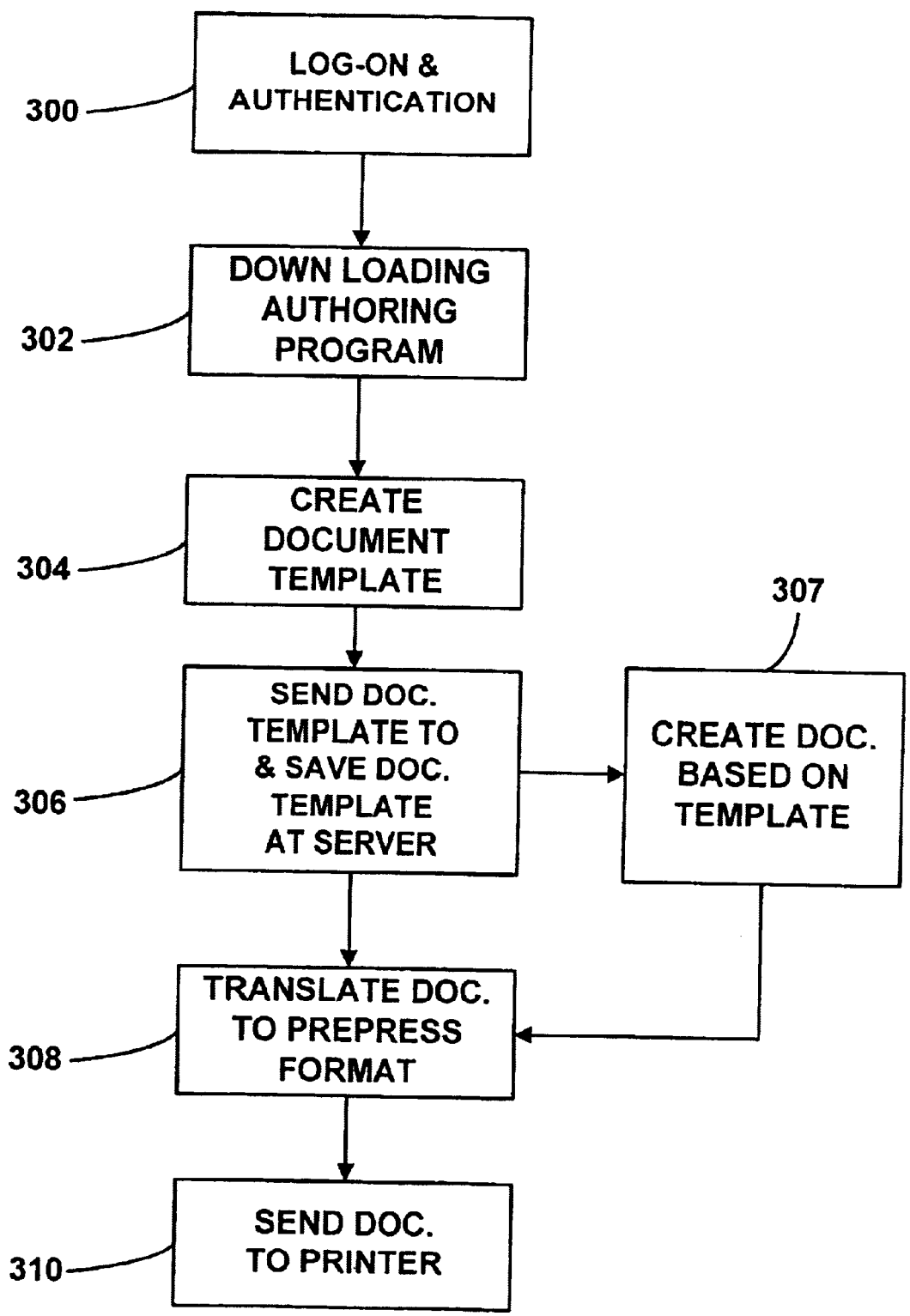
FIG. 3 is a diagram of a computerized prepress method in accordance with one embodiment of the invention.

Referring next to FIG. 3, a flowchart of a computerized method according to an embodiment of the invention is shown. This method is inclusive of the steps or acts required to be taken by a client computer, a server computer, and a printer computer to create a document at the client computer, for translation by the server computer, and for printing at the printer computer, in accordance with one embodiment of the invention. These steps or acts are performed in accordance with one or more computer programs, such as authoring programs, and translation programs, as have been described in conjunction with FIG. 2. The embodiment of the invention described in conjunction with FIG. 3 refers to the situation where the client, the server and the printer are communicatively coupled to one another through the Internet, where the client is running a web browser program and the server is a web server; however, the invention is not so limited.

In step 300, the first client computer accesses the web site of the web server, as referenced by a URL address, through its web browser program, and logs onto the web server. Logging on to the server desirably includes submitting user information regarding the administrative user at the client, such as the a user's name and password. Once the server has received this information, it authenticates the administrative user, looking up the user information submitted to determine whether such a user exists, and whether the password for the user is correct. Authentication also includes associating the user with a particular directory on the server computer (e.g., on which to store the documents created by the user), a set of defaults regarding options available to the user within the authoring program (e.g., fonts, colors, images and commands), and an authorization level. The authorization level dictates what the user is permitted to do within the program; for example, the "administrator" may be permitted to access anyone's documents within the administrator's work group.

In step 302, the first client downloads the authoring program from the server. As has been described, in one embodiment the authoring program is coded in Java, such that the program is a Java applet running within the browser program of the client. In step 304, the first client then uses the authoring program to create a document template, such as a business card, a letterhead, etc. The creation of the document template involves determining which logos and images are to be fixed in any document created therefrom, as well as the font type and sizes, as well as position of allowable text entry, for any document created therefrom. Once the document template has been created, the first client selects a save command, which uploads the document template to the server, where it is saved, in step 306.

In 307, a document is created based on the document template. This involves a second client computer accessing the web site of the web server, through its web browser program, and logging onto the web server as has been described. The user of the second client is then authenticated at the server computer. The second client can create the document based on the document template in at least one of two ways. First, the second client can download the authoring program, as has been described, from the server program, and using the authoring program to create a document consistent with and based on the document template. This means that the user of the second client is only able to enter in and change information present as prescribed by the document template. For example, the logo and any images of the document template may be fixed in the template, such that the user in creating his or her document may not alter, move or delete them. As another example, the document template may indicate what information can be entered by the user, and where this information is to be positioned on the document—such as the user's name, telephone number, address, title, etc. The document template may also fix the font type and size of this textual information.

A second way a client can create the document based on the document template is to download a form, such as an HTML form, through its web browser program, where the form has tags corresponding to criteria in the document template. The tags may be HTML tags, for instance. The criteria may indicate information such as the user's first name, middle initial, last name, telephone number, company name, fax number, address, title, etc. The user through the web browser program then enters in information corresponding to the tags of the HTML form. The criteria in the document template are then replaced with the corresponding information entered to create the document based on the document template.

Once the document has been created, the second client selects a save command, which uploads the document to the server, where it is saved. Furthermore, once the document is in final form according to the user, the user selects a print command in step 308. This signals the server to translate the document into a suitable prepress format, such as PostScript, or another format as previously described, and send the document to the printer computer in step 310, such as an electronic mail attachment. Thus, the internal format in which the document is saved in step 306 is different than the format to which the document is translated in step 308 and sent to the printer in step 310. Once the printer receives the document, the document may then be printed and published.

Figure 4A:
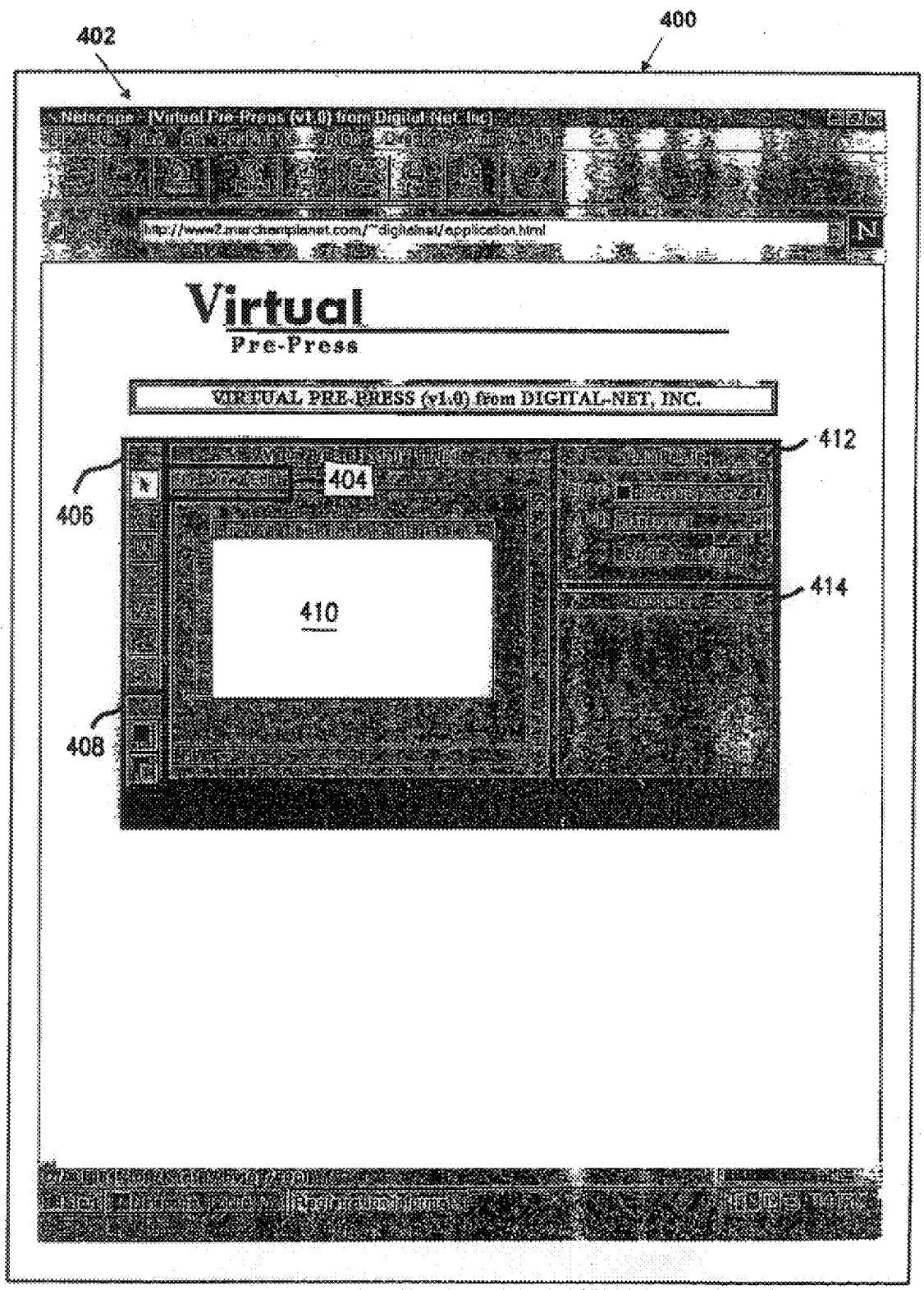

Referring next to FIGS. 4a–4m, diagrams of screens displayed on a display device of a computer in conjunction with one embodiment of the invention are shown. More particularly, the diagrams are screens regarding an authoring program according to one embodiment of the invention. The authoring program may be for either an administrative user to create a document template, or an (end) user to modify a document template as so permitted to create a document. Referring first to FIG. 4a, within display device 400 is operating environment window 402 within which the authoring program runs. Specifically, operating environment window 402 is part of a web browser program, such as Netscape Navigator. The authoring program is a Java applet that runs within the web browser. The authoring program includes six primary areas: menu bar 404, tool bar 406, orientation bar 408, work area 410, color palette area 412, and properties area 414. The user of the computer utilizes tool bar 406, orientation bar 408, menu bar 404, color palette area 412, and properties area 414 as tools to create a document within work area 410. Work area 410 is sized in accordance with the type of document to be created. For example, as shown in FIG. 4a, the type of document to be created is a business card. The properties area 414 shows commands that may be used in conjunction with the currently selected tool from tool bar 406.

Figure 4B:
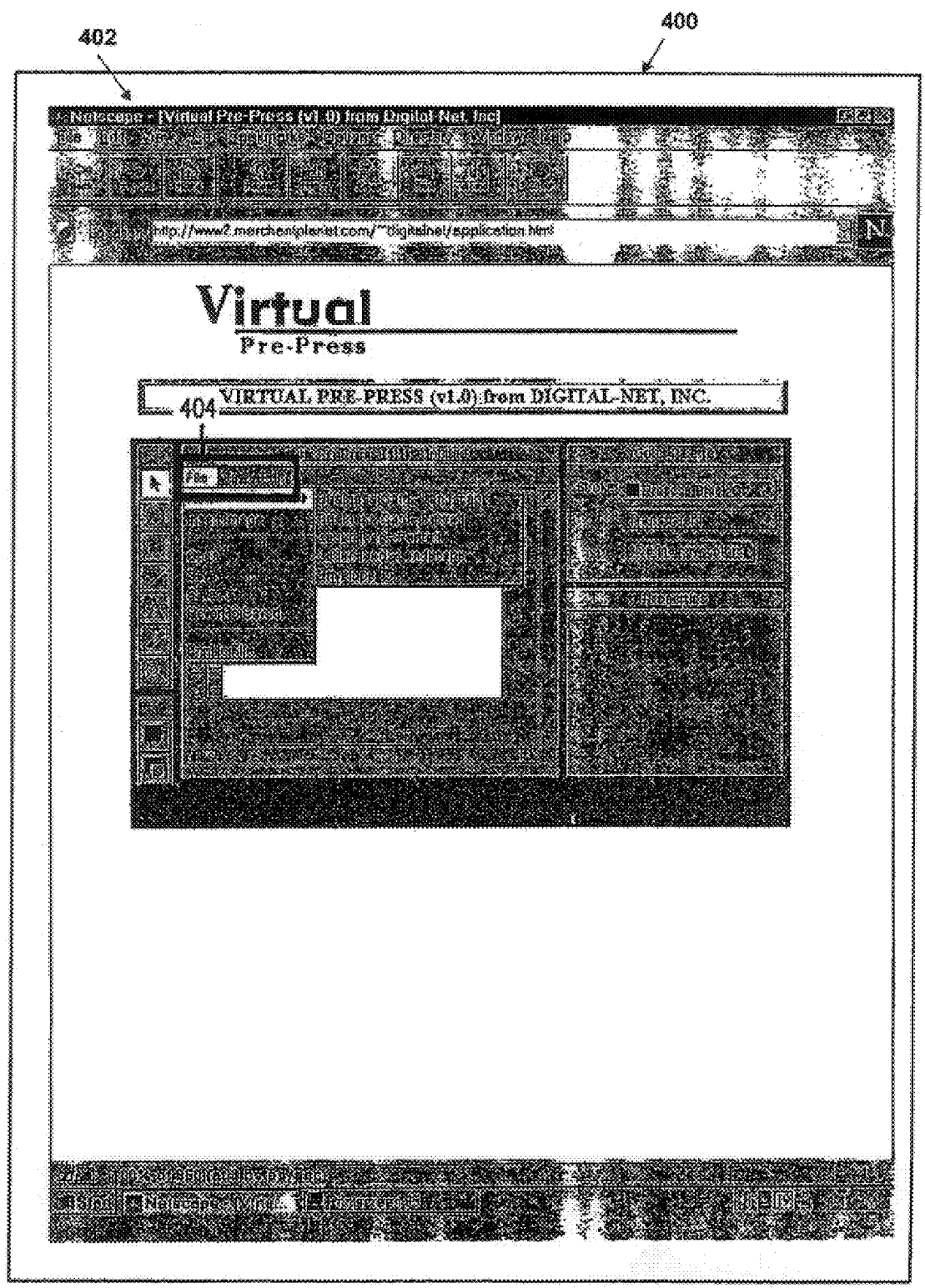

Clicking "file" on menu bar 404 drops down the file menu, as shown in FIG. 4b. The file menu permits a user to create a new document, such as a business card, letterhead, or envelope, insert an image, open or save a document, revert the current work area to the document as most recently saved, or print to a file (i.e., cause the translation program to be run). The images are saved as files on the server in a particular format, such as encapsulated PostScript, TIFF, GIF, and JPEG. Desirably, the images have a maximum resolution of 1:1, to minimize the size of the encapsulated PostScript file (or file in another format). Opening or saving a document retrieves or stores a document, respectively, on a computer-readable medium of the server. Printing the document to a file causes the translation program to run, such that the file is translated to a format suitable for prepress, and then sent to the printer.

Figure 4C:
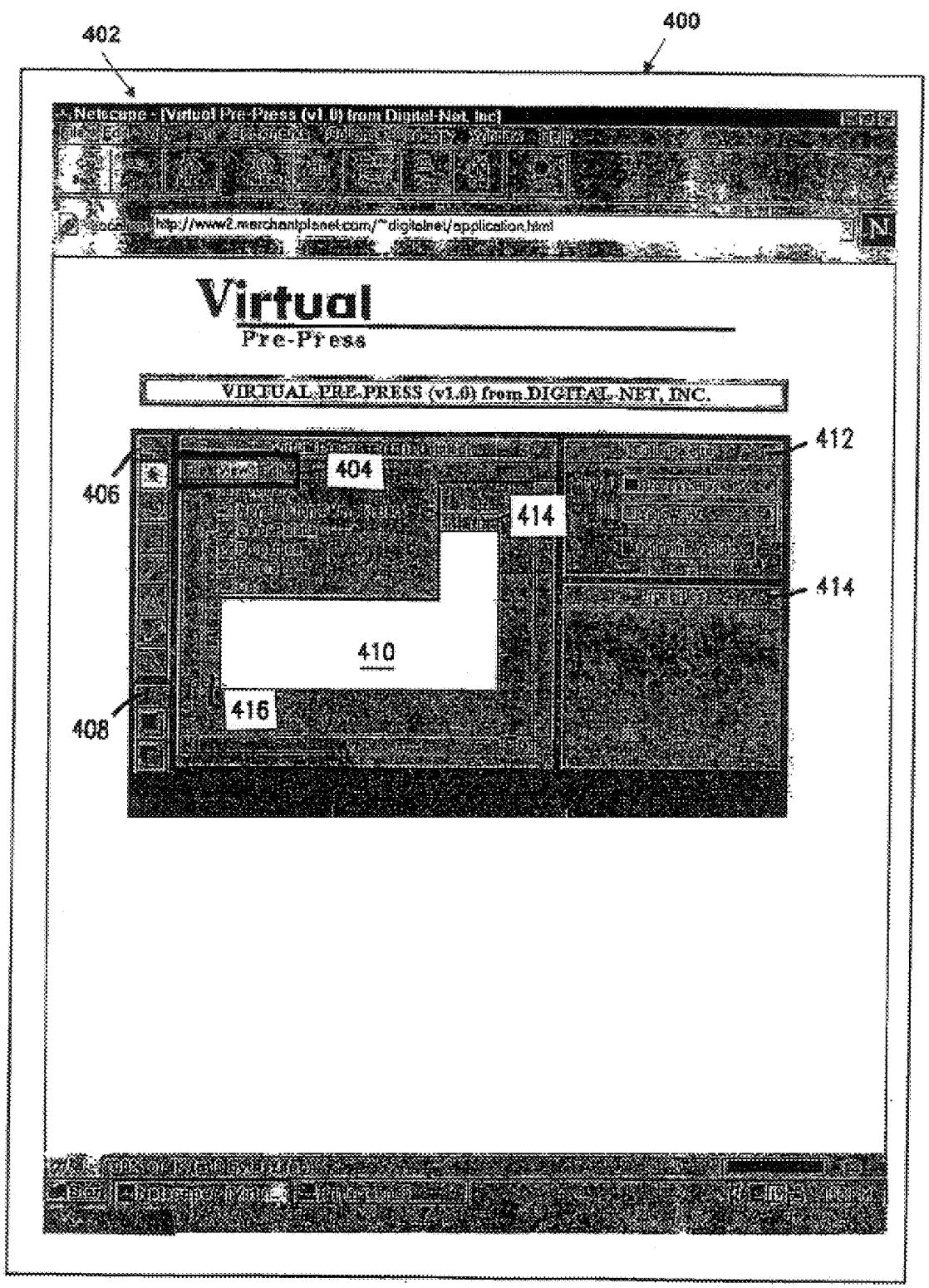

Clicking "View" on menu bar 404 drops down the view menu, as shown in FIG. 4c. The view menu permits a user to call up different tools of the authoring program, which may have become hidden from view (e.g., by previous user choice), or previously unselected by the user. Selecting "Toolbar" calls up tool bar 406. Selecting "Move to Front/Move to Back" calls up orientation bar 408. Selecting "Color Palette" brings up color palette area 412. Selecting "Properties" brings up properties area 414. Selecting "Rulers" brings into view rulers 416 and 414, each on a side of work area 410. Finally, selecting "Grid" causes a grid to be superimposed on work area 410 (not shown in FIG. 4c).

Figure 4D:
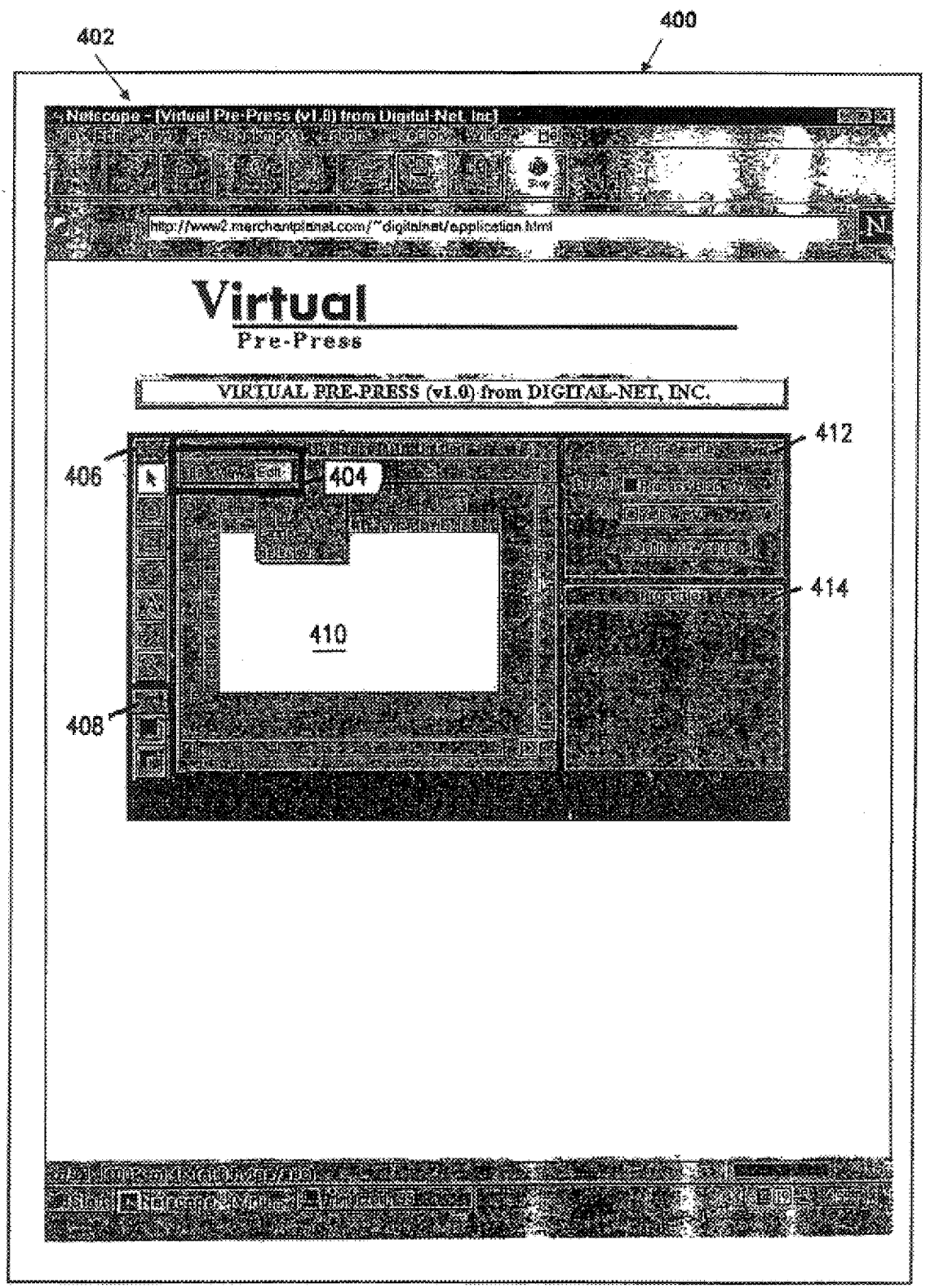

Clicking "Edit" on menu bar 404 drops down the edit menu, as shown in FIG. 4d. The edit menu permits a user to cut, copy, paste selected elements (i.e., objects) within work area 410, or select all the elements, such that the user is then able to cut, copy, or paste all the elements. The cut, copy, and paste commands thus operate as known to those of ordinary skill within the art.

Figure 4E:
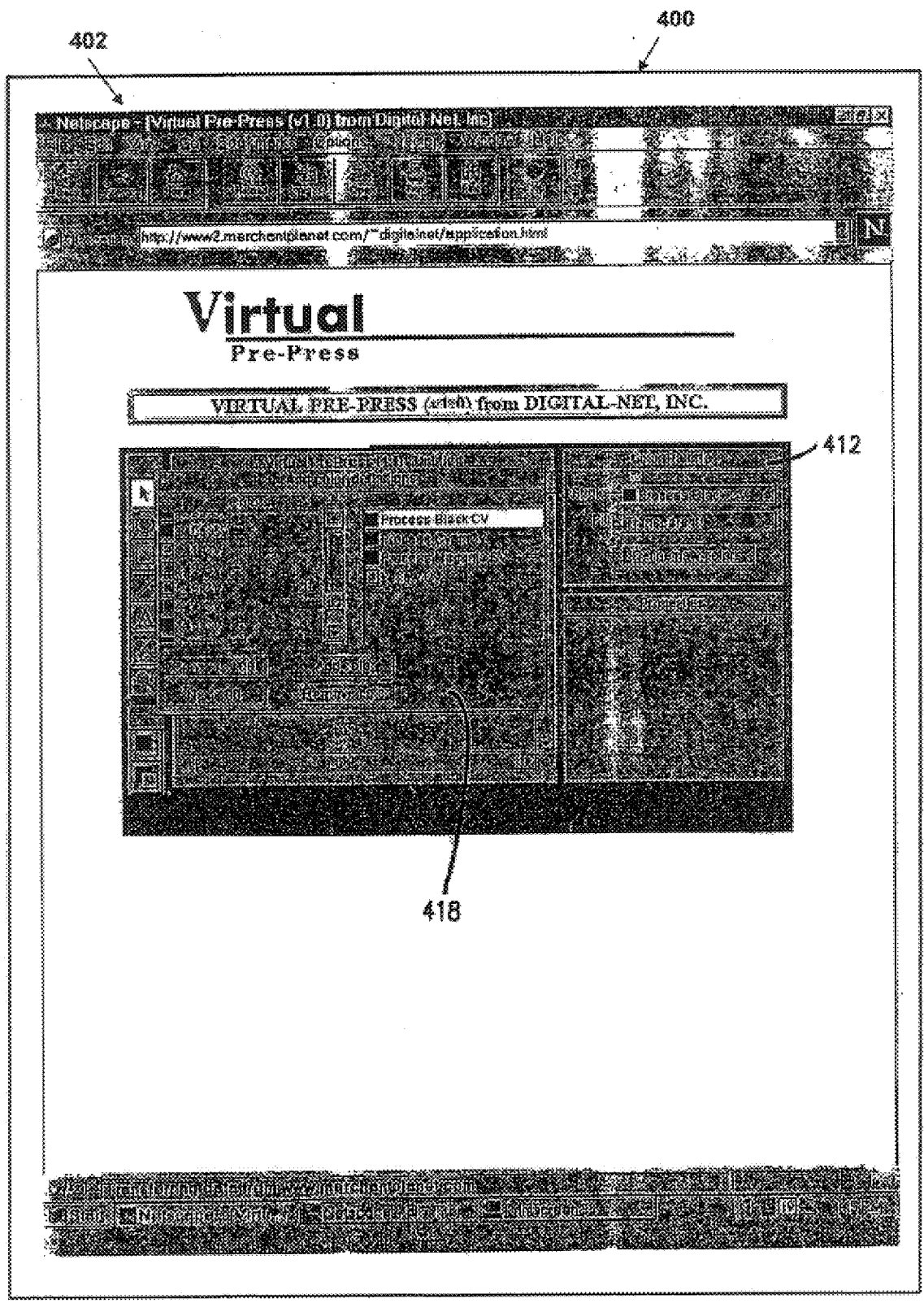

Color palette area 412 is described in conjunction with FIG. 4e. The user is able to select both stroke and fill color from a menu of predetermined colors. The stroke color refers to the color in which the boundaries of a particular object is drawn within work area 410 (not shown in FIG. 4e), while the fill color refers to the color inside the boundaries of the particular object within work area 410. Colors may be added within the menu of predetermined colors by defining a new color, accomplished by pressing the define new colors button, which brings up window 418. Within the window, the user is able to select new colors, which are desirably the entire palette of colors available from Pantone, as known within the art. In other embodiments, colors are selected from palettes of colors available from Toyo, Focaltone, or Tru-match, as also known within the art.

Figure 4F:
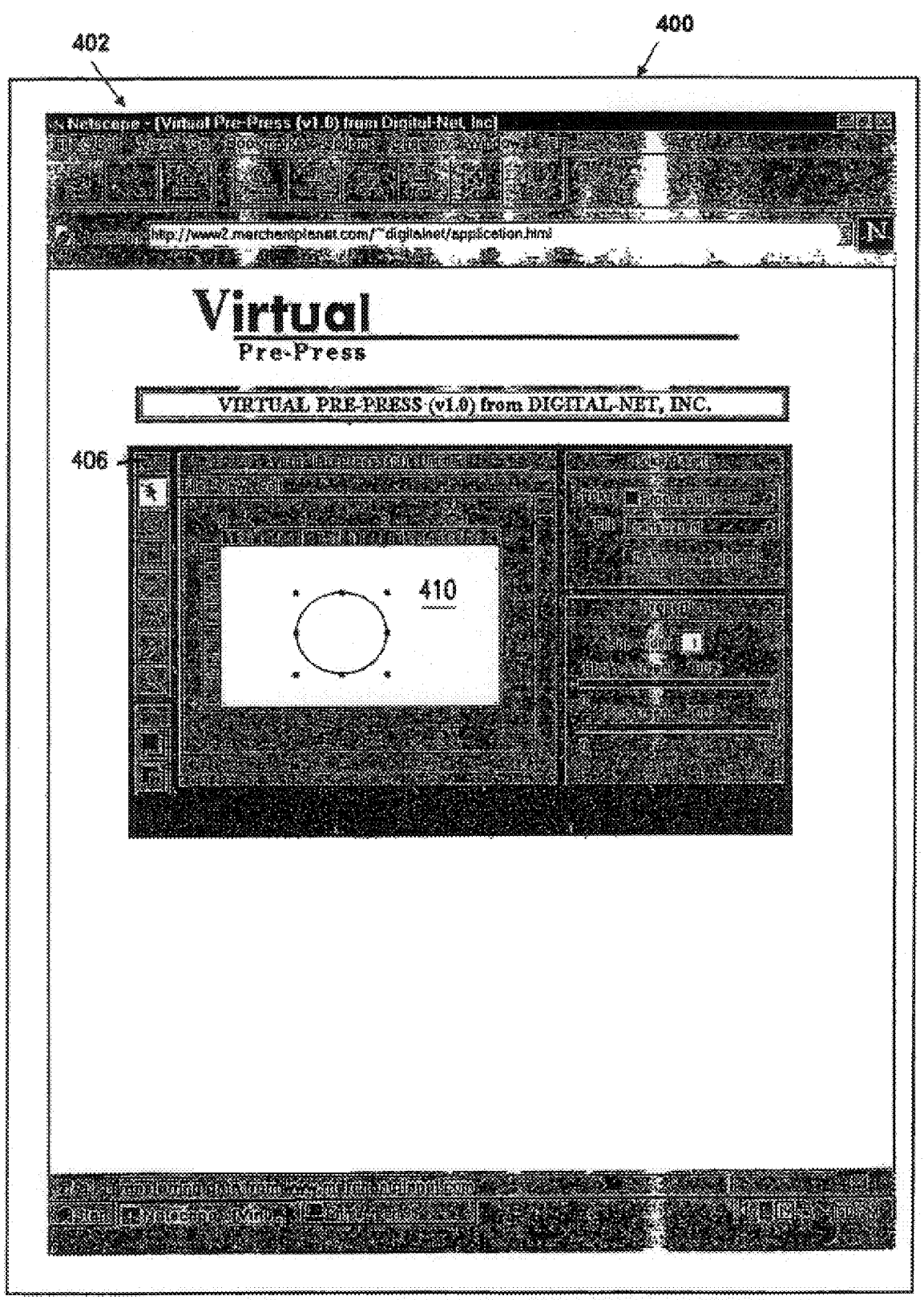
Figure 4G:
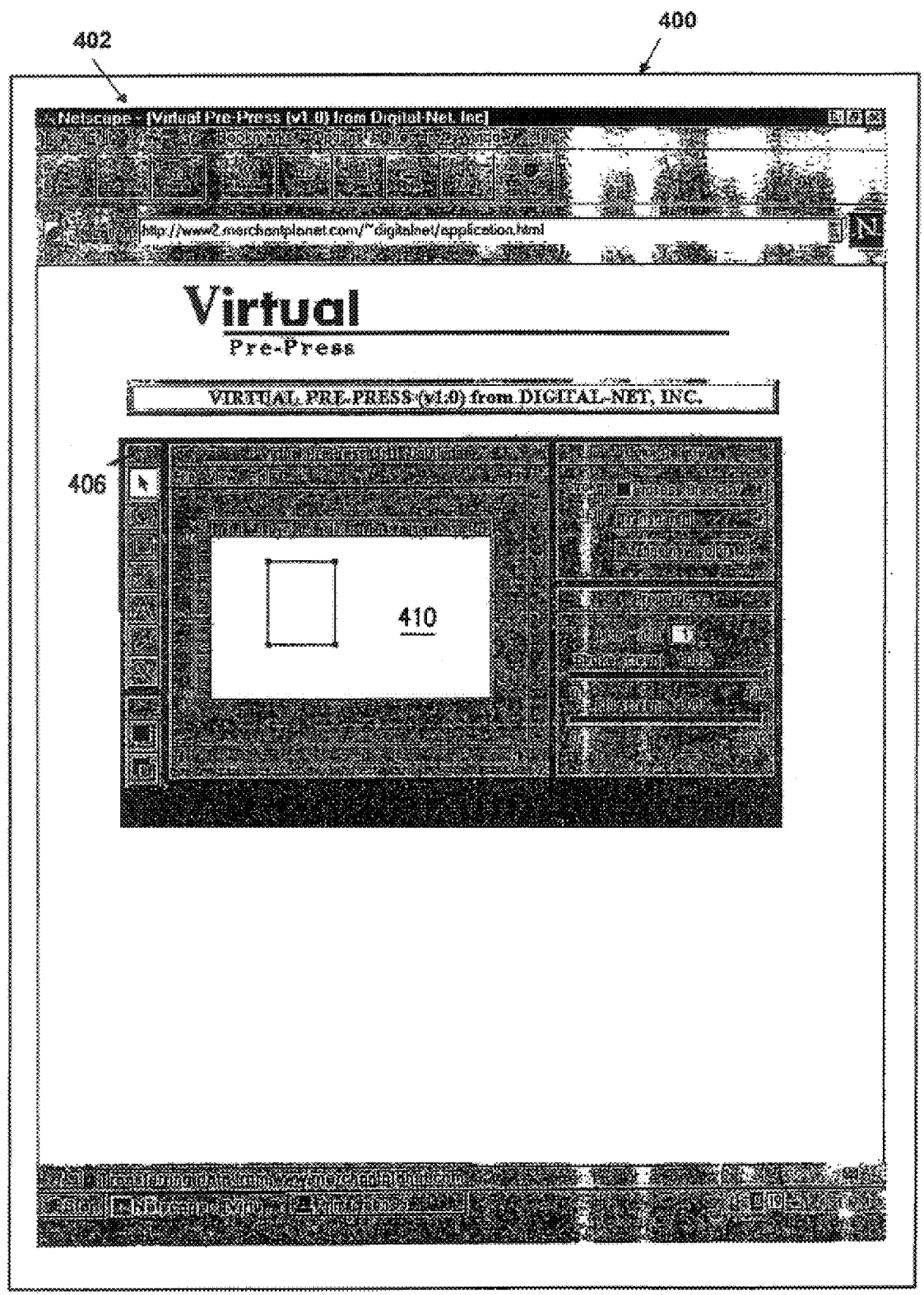
Figure 4H:
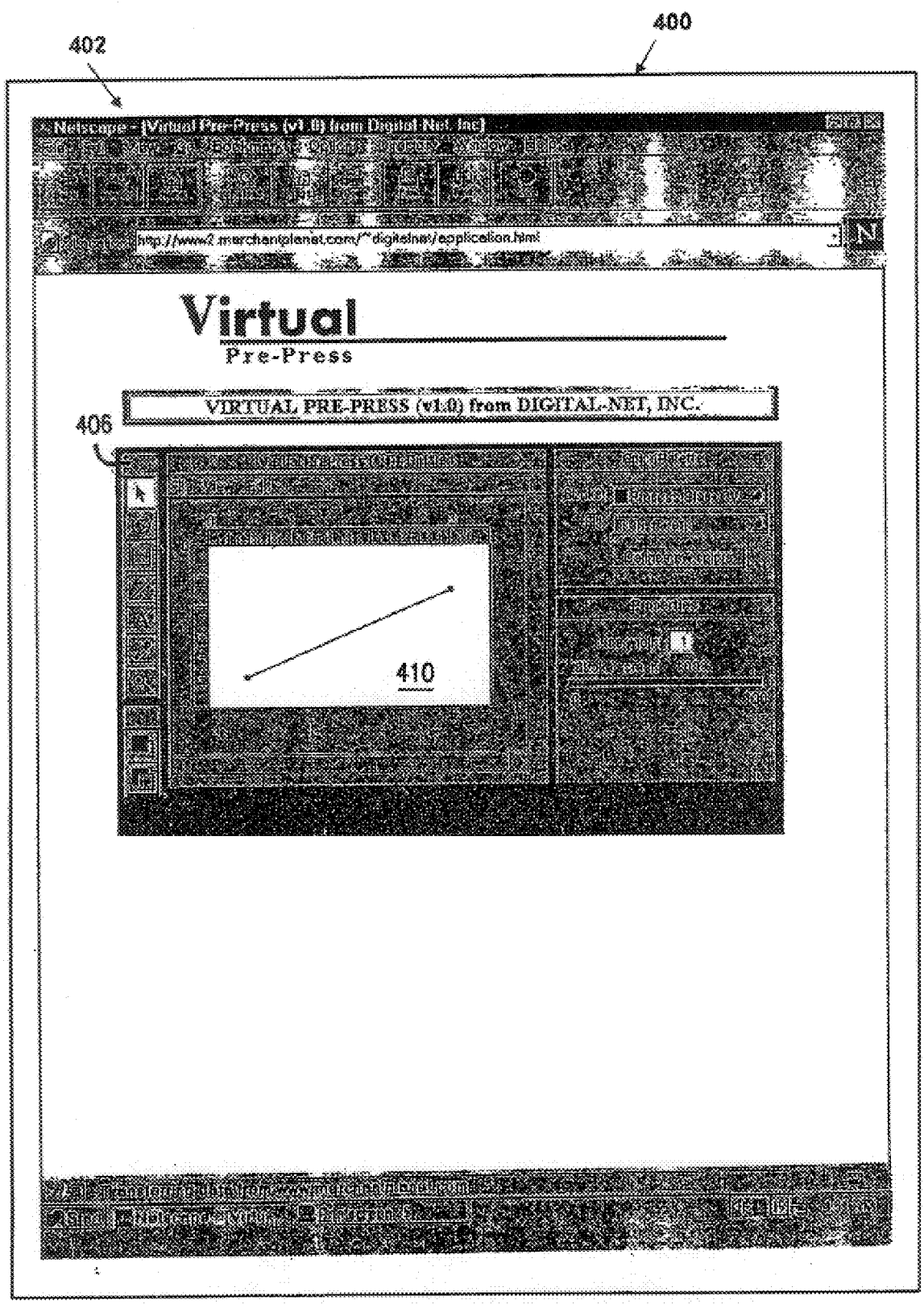

Referring next to FIG. 4f, selecting the arrow tool on tool bar 406 allows the user to select an object within work area 410. Selecting the circle tool on tool bar 406 enables a user to create a circle or oval, such as that shown in work area 410 in FIG. 4f. Referring next to FIG. 4g, selecting the rectangle tool on tool bar 406 permits a user to create a rectangle, such as that shown in work area 410 in FIG. 4g. Referring next to FIG. 4h, selecting the line tool on tool bar 406 enables a user to create a line, such as that shown in work area 410 in FIG. 4h. In the creation of a circle, rectangle, or line, the authoring program performs the creation of the particular object (e.g., the circle, the rectangle, or the line) itself, and does not consult the server to determine the manner in which the object is to be created.

Figure 4I:
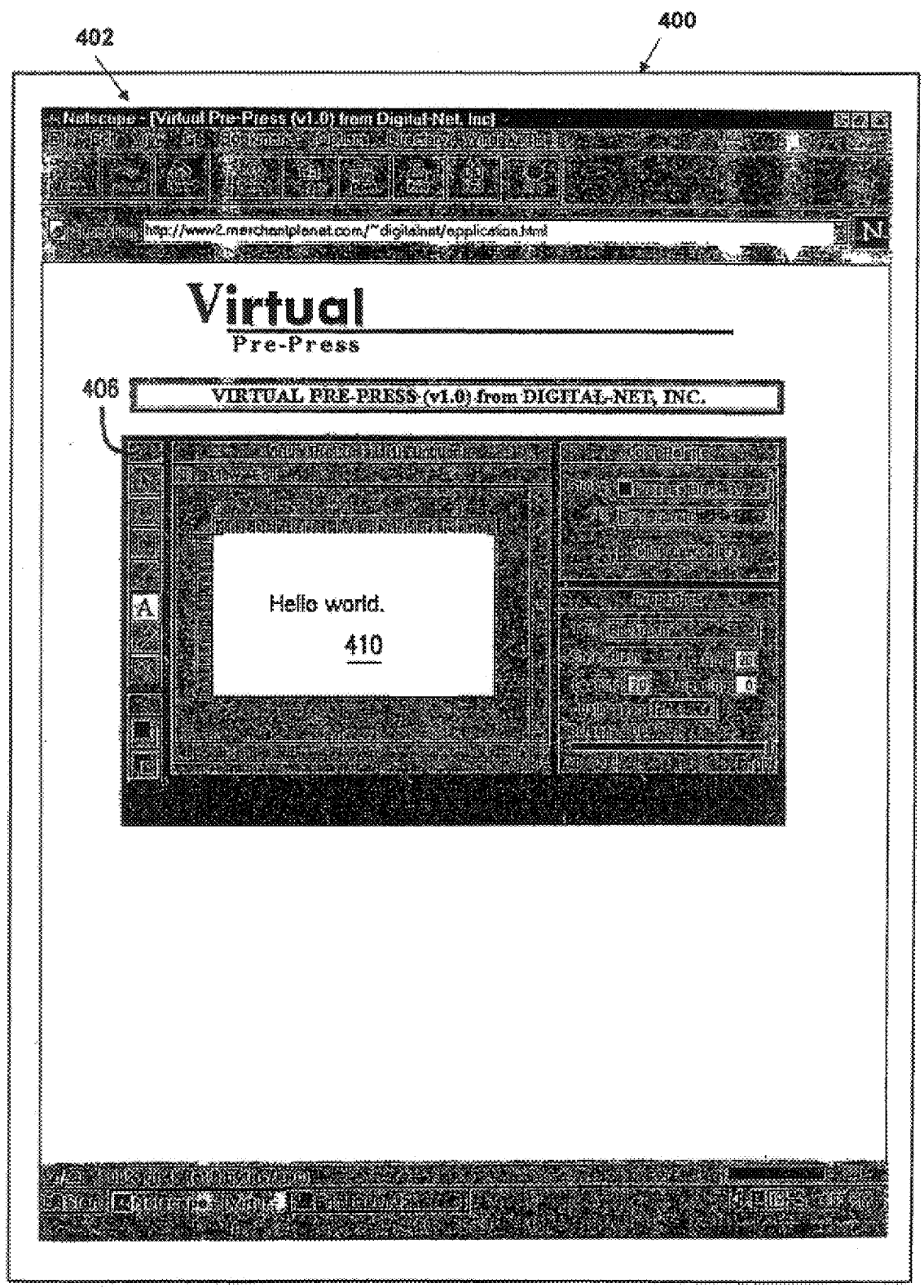
Figure 4J:
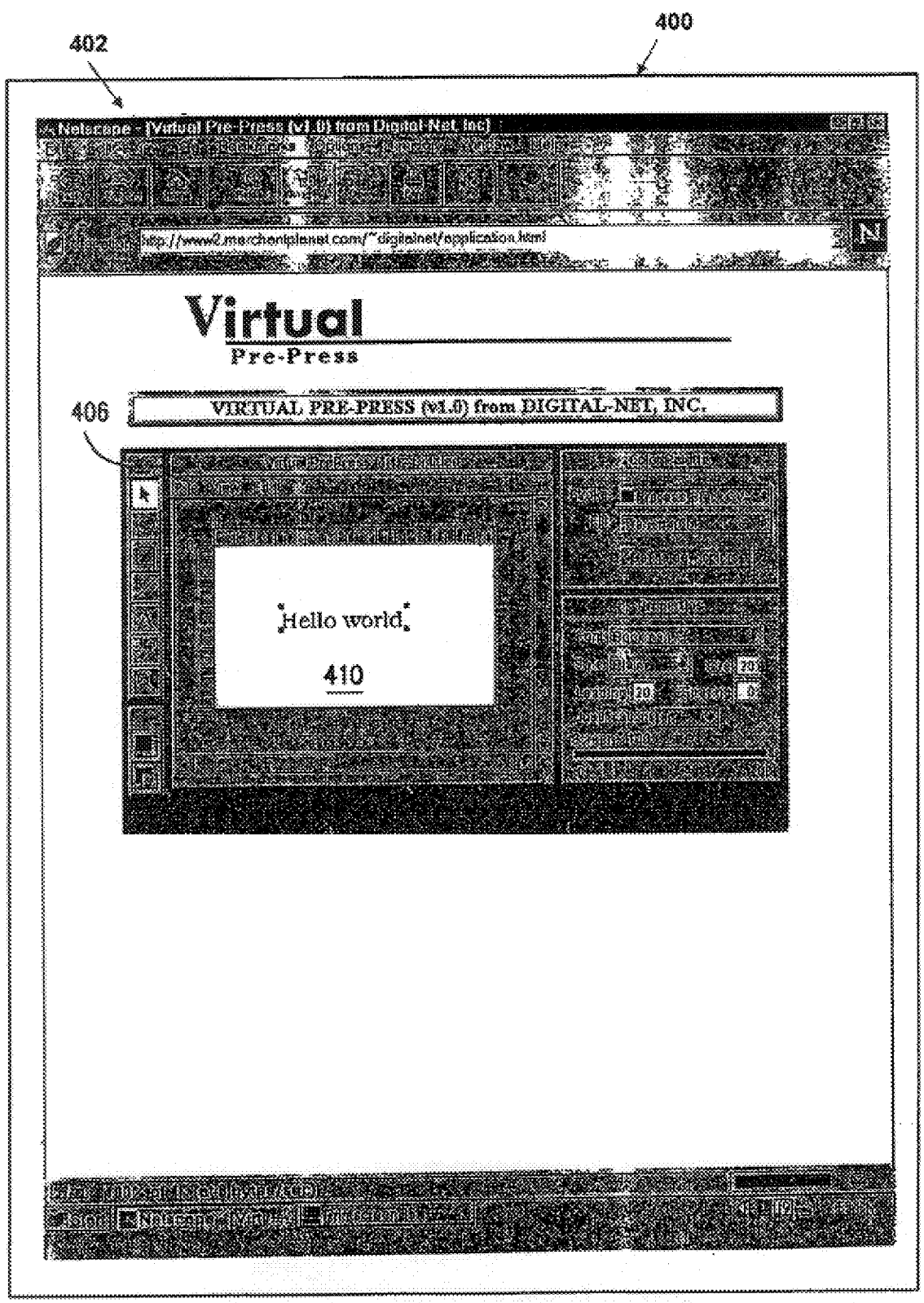

Conversely, selecting the text tool on tool bar 406 causes the authoring program to first allow the user to input the text to be entered on work area 410, displaying the text in a rough manner. Next, the authoring program sends the text to the server, which translates the text into an image, desirably an image in GIF format and having a maximum resolution of 4:1, which is then sent back to the client for display on work area 410. (Other image formats include JPEG and TIFF; the invention is not so limited.) This is shown in conjunction with FIGS. 4i and 4j. In FIG. 4i, the user has entered the text string "Hello world" but has not yet pressed return; therefore, the text string is shown in a rough manner. Once the user presses return, the client sends the text string to the server for conversion to an image, which is then sent to the client and displayed on work area 410, as is shown in FIG. 4j. The reason this is accomplished is that different computers have different font generation engines, while the authoring program is desirably a what-you-see-is-what-you-get (WYSIWYG) program, showing the user on the display device exactly what will be printed at the printer.

Figure 4K:
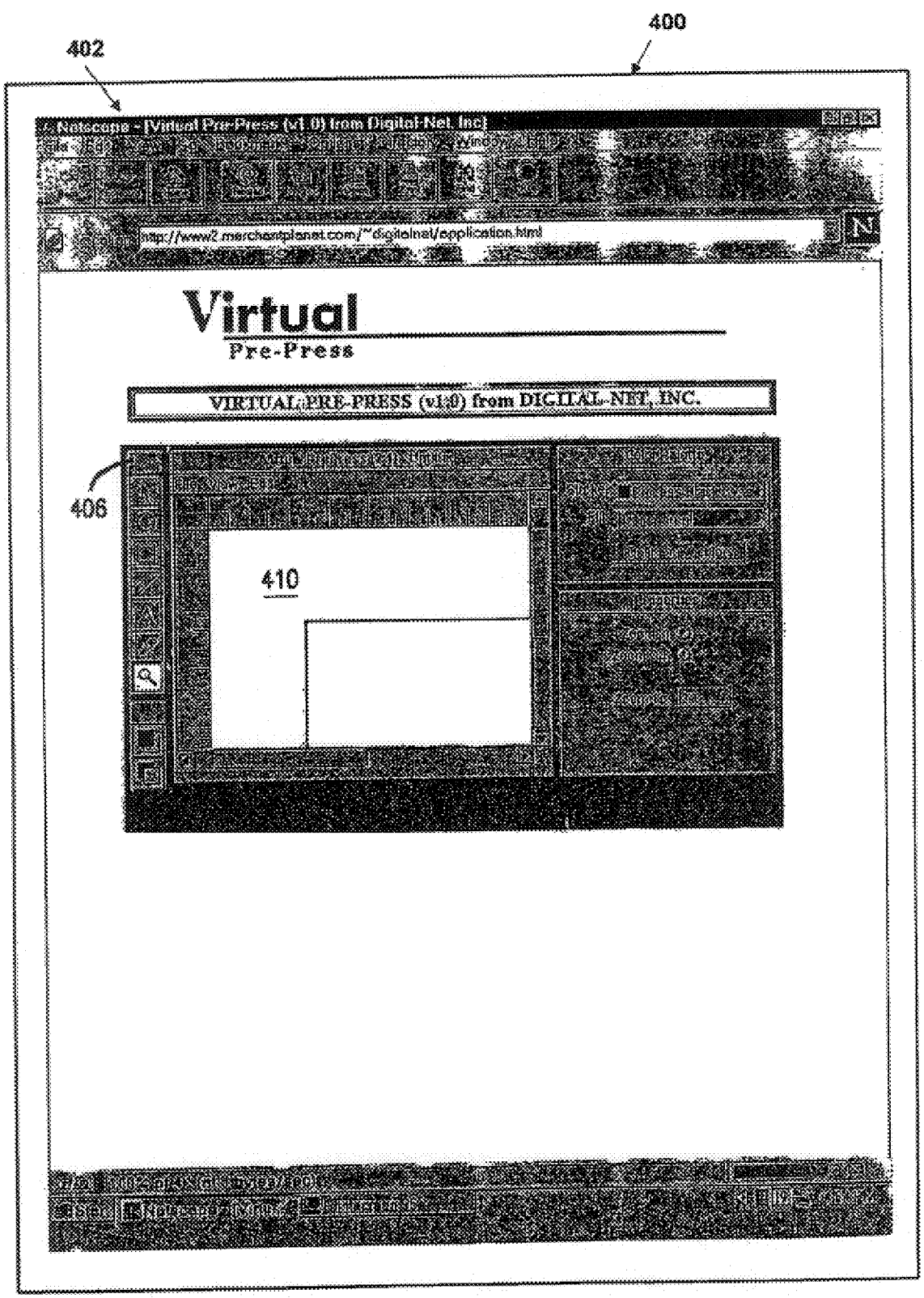
Figure 4I:
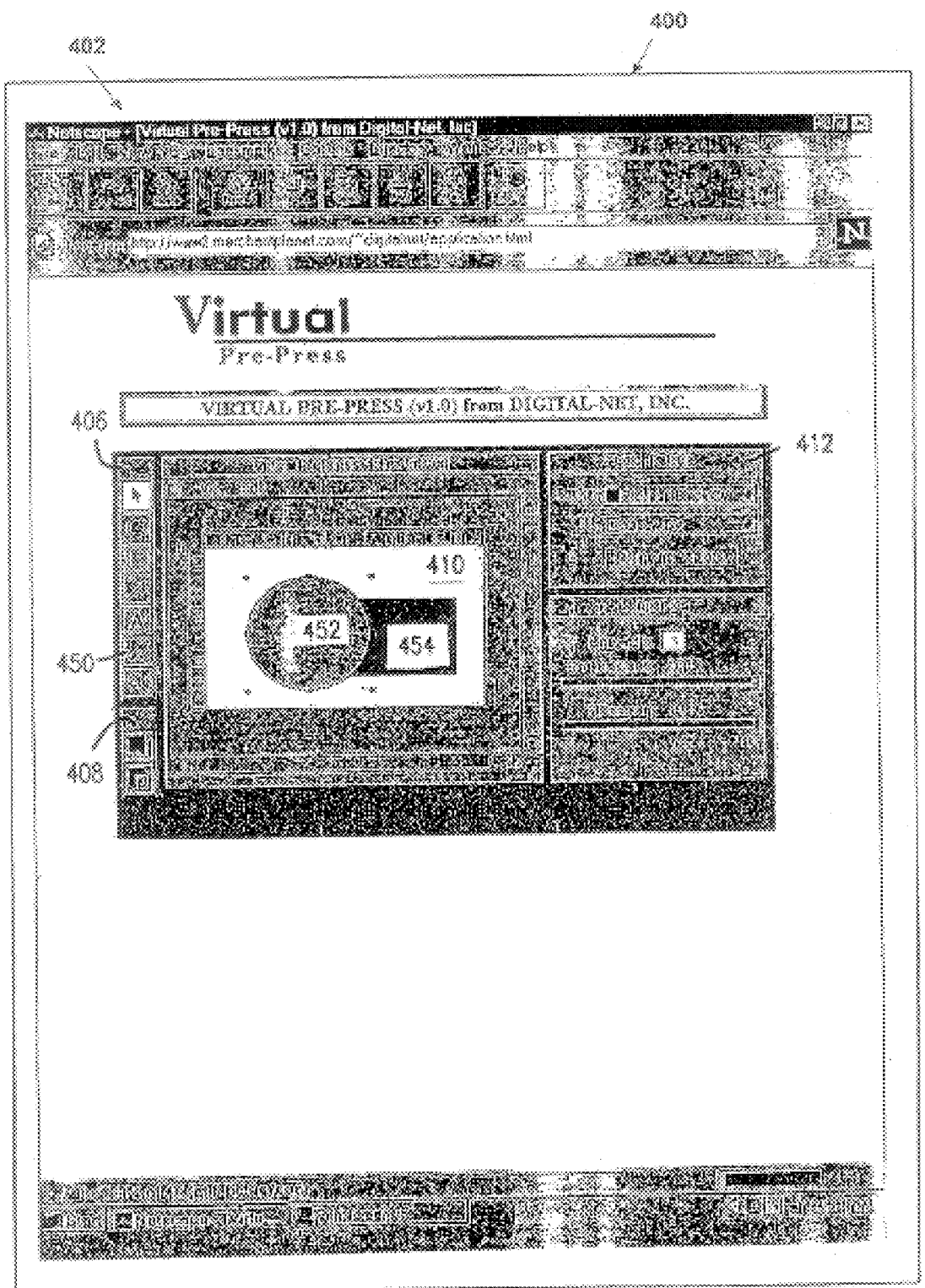

Referring next to FIG. 4k, selecting the zoom tool on tool bar 406 enables a user to zoom in and out on the document within work area 410, as is shown in FIG. 4k. Referring to FIG. 4l, selecting the color picker tool (tool 450) on tool bar 406 enables a user to set a color within color palette area 412 to that of a current object within work area 410. For example, clicking within object 452 in work area 410 while using the color picker tool sets the current fill color to that of the fill color of object 452. This enables users to precisely set a color to an already existing color within the document, which is especially advantageous in situations where there are multiple shades of one color in a document, which may be difficult to discern.

Figure 4M:
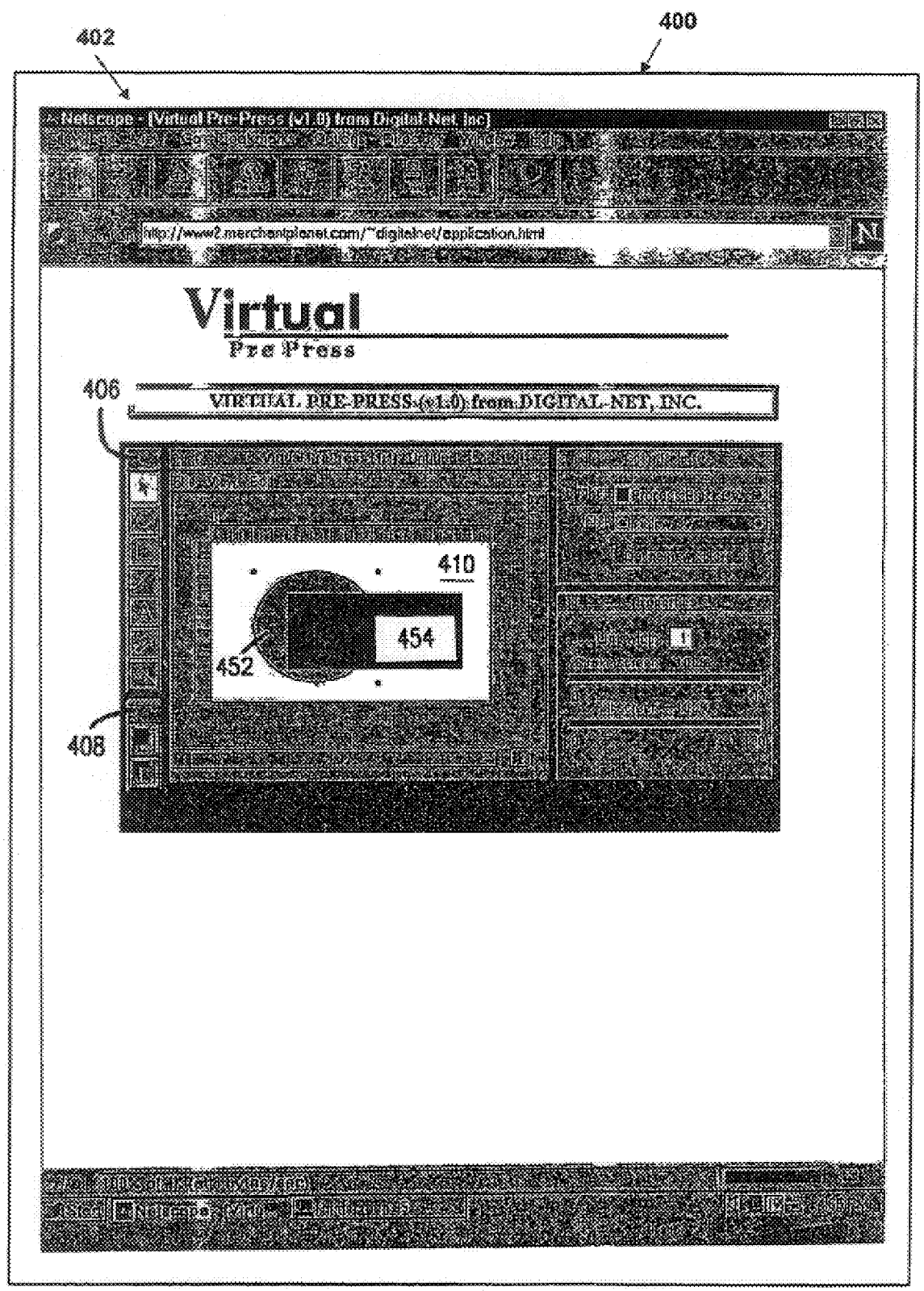

Selecting the top icon within orientation bar 408 brings the currently selected object within area 410 to the front of other objects. For example, as shown in FIG. 4l, selecting the top icon while object 452 is selected (as denoted by dots outlining the rectangular boundary of the object) brings object 452 to the front, over the other object within the work area (e.g., object 454). Conversely, selecting the bottom icon within orientation bar 408 moves the currently selected object within area 410 to the back of other objects. For example, as shown in FIG. 4m, selecting the bottom icon while object 452 is selected moves object 452 to the back, behind the other object within the work area (e.g., object 454).

It is noted that with respect to the creation of a document based on a document template, the diagrams of screens of FIGS. 4a–4m relate to only one way by which a user can create such a document based on a template. The invention is not so particularly limited. Another way is shown by reference to FIGS. 5a–5d, which are diagrams of screen displayed on a display device of a computer in conjunction with one embodiment of the invention are shown. More particularly, the diagrams are screens regarding the filling in of forms to create a document from a document template, according to one embodiment of the invention.

Figure 5A:
Figure 5C:

Referring first to FIG. 5a, within display device 500 is operating environment window 502. Specifically, operating environment window 502 is part of a web browser program, such as Netscape Navigator. The operating environment window 502 has loaded a web page off a network such as the Internet. The web page shows a document template 503. The user is then queried to enter information regarding criteria of the document template 503, such as Fname (first name), Minitial (middle initial), etc. Thus, the user enters his or her first name in field 504, middle initial in field 506, last name in field 508, and title or position in field 510. Each field corresponds to a tag, such as an HTML tag, within the web page, which is not shown in FIG. 5a. Referring next to FIG. 5b, the user is queried to enter in more information regarding the criteria of the document template. Thus, the user enters his or her division in field 512, address in field 514, suite/number in field 516 (optional), city in field 518, state in field 520, zip/postal code in field 522, and email address in field 524. Furthermore, the user is able to enter various phone numbers in fields 526.

Once the user has entered in this information, button 528 is clicked. This causes display of the screen shown in FIG. 5c, where the document template has been changed to a document 530 indicative of the information entered in by the user. It is noted that the user only is able to enter in textual information as dictated by the document template. The user is not, for example, permitted to change the logo 532, nor other information, such as the company name, and the font type and size in which the various textual information is shown on the document 530. In this manner, the document template provides a manner by which an administrative user can define the overall characteristics of a given design of a document, such that other users can input information to be formatted in accordance with and as allowed by the document template, but cannot change those characteristics that the document template does not permit changing of. Thus, a consistent "look" exists over all the documents created from a given template, even though all those documents may vary in some ways from one another. If the user is not satisfied with the document 530 in FIG. 5c, he or she may reenter or change information in the various fields 534 of FIG. 5c and FIG. 5d, and reclick button 528 to see the changed information in the document 530.

Computerized prepress has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is fully intended to cover databases as well as dynamic directories, such that the term directory may be interpreted to encompass any database amenable to the invention in such an embodiment of the invention. Therefore, it is manifestly intended that this invention be limited only by the following claims and equivalents thereof.

We claim:

1. A computerized prepress method comprising:

storing on a server computer system a computerized prepress software system, wherein the prepress software system includes a document authoring program downloadable from the server to a client computer, the program having one or more authoring tools used to create an electronic document;

wherein the downloaded program executes in a web browser of the client computer and displays the electronic document in WYSIWYG form to the user of the client computer, and at least one of the authoring tools has one or more functions that allows a user to select and edit at least one element of the electronic document while at least a portion of the electronic document is simultaneously displayed;

the software system further configured to provide that at least one of the authoring tools is adapted to create an electronic document using the client computer, and that the electronic document is uploaded to the server computer system in a form allowing a translation component to create a prepress format file so that when the prepress format file is used to produce a document the document is consistent with the WYSIWYG form displayed to the user on the client computer, and so that the user need not be concerned with creating a prepress format file, and further so that the authored electronic document can be processed into a prepress format file;

downloading the authoring program from the server computer system to the client computer;

the user using at least one authoring tool of the downloaded program at the client computer to create an electronic document;

uploading the electronic document to the server computer system.

2. The computerized prepress method of claim 1, wherein the client computer and the server computer are communicatively coupled to one another through the Internet.

3. The computerized prepress method of claim 1, wherein the client computer and the server computer are communicatively coupled to one another through an intranet.

4. The computerized prepress method of claim 1, wherein the client computer and the server computer are communicatively coupled to one another through an extranet.

5. The computerized prepress method of claim 1, comprising the additional steps of sending log-on information regarding a user from a client computer to the server computer systems over the Internet and authenticating the user at the server computer system.

6. The computerized prepress method of claim 1, wherein the authoring program downloaded from the server computer system to the client computer is coded in a language selected from the group essentially comprising Perl, Java, C++, C, and ActiveX.

7. The computerized prepress method of claim 1, wherein the electronic document is selected from the group essentially comprising a business card, a letterhead, an envelope, and a brochure.

8. The computerized prepress method of claim 1, wherein the authoring program comprises a color plate area to select a color from palette of colors.

9. The computerized prepress method of claim 8, wherein the palette of colors comprises the palette of colors available from one selected from the group essentially comprising Pantone, Toyo, Focaltone, and Tru-Match.

10. The computerize prepress method of claim 1, wherein using one of the authoring tools of the authoring program at the client computer to create an electronic document comprises sending desired text from the client computer to the server computer system for translation into an image and sending the image from the server computer system back to the client computer.

11. The computerized prepress method of claim 10, wherein the image is in a format selected from the group essentially comprising GIF, TIFF, and JPEG.

12. The computerized prepress method of claim 10, wherein the image has a maximum resolution of 4:1.

13. The computerized prepress method of claim 1, wherein the document includes one or more images, at least one of the images being in a format selected from the group essentially comprising encapsulated PostScript, TIFF, GIF, and JPEG.

14. The computerized prepress method of claim 13, wherein at least one of the images has a maximum resolution of 1:1.

15. The computerized prepress method of claim 1, wherein the different format file is selected from a group essentially comprising PostScript, HTML, PDF, and PostScript Extreme.

16. The computerized prepress method of claim 1, further including distributing the prepress format file to a location remote from the server computer system for printing at the remote location.

17. The computerized prepress method of claim 16, wherein the electronic mail is MIME-compliant.

18. A computerized prepress system comprising:
a server having stored thereon a computerized prepress software system including a document authoring program downloadable from the server to a client computer, the program having one or more authoring tools used to create an electronic document;
wherein the downloaded program executes in a web browser of the client computer and displays the electronic document in WYSIWYG form to the user of the client computer, and at least one of the authoring tools has one or more functions that allows a user to select and edit at least one element of the electronic document while at least a portion of the electronic document is simultaneously displayed;
the software system further configured to provide that at least one of the authoring tools is adapted to create an electronic document using the client computer, and that the electronic document is uploaded to the server computer system in a form allowing a translation component to create the prepress format file so that when the prepress format file is used to produce a document the document is consistent with the WYSIWYG form displayed to the user on the client computer, and so that the user need not be concerned with creating a prepress format file.

19. The computerized prepress method of claim 18, wherein the server, the client and the printer are communicatively coupled to one another through the Internet.

20. The computerized prepress method of claim 18, wherein the server, the client and the printer are communicatively coupled to one another through an intranet.

21. The computerized prepress method of claim 18, wherein the server, the client and the printer are communicatively coupled to one another through an extranet.

22. The computerized prepress system of claim 18, wherein the server comprises an Internet world-wide-web server.

23. The computerized prepress system of claim 18, wherein the server comprises and intranet world-wide-web server.

24. The computerized prepress system of claim 18, wherein the server comprises an extranet world-wide-web server.

25. The computerized prepress system of claim 18, wherein the authoring program runs on the client in an Internet world-wide-web browser program.

26. The computerized prepress system of claim 18, wherein the browser program is selected from the group essentially, comprising Netscape Navigator and Microsoft Internet Explorer.

27. The computerized prepress system of claim 18, wherein the authoring program runs on the client in an intranet world-wide-wed browser program.

28. The computerized prepress system of claim 18, wherein the authoring program runs on the client in an extranet worldwide-web browser program.

29. The computerized prepress system of claim 18, wherein the authoring program is coded in a language selected from the group essentially comprising Perl, Java, C++, C, and ActiveX.

30. The computerized prepress system of claim 18, wherein the electronic document is selected from the group essentially comprising a business card, a letterhead, an envelope, and a brochure.

31. The computerized prepress system of claim 18, wherein the authoring program comprises a color palette area to select a color from a palette of colors.

32. The computerized prepress system of claim 18, wherein the suitable prepress format file is selected from a group essentially comprising PostScript, HTML, PDF, and PostScript Extreme.

33. The computerized prepress system of claim 18, wherein the printer receives the document from the server via an electronic mail to which the document is included as an attachment.

34. A client computer comprising:
a processor;
a computer-readable medium;
a communications device;
an operating environment program comprising a web browser executed by the processor from the medium; and
an authoring program having one or more authoring tools used to create an electronic document, the program being downloaded from a server to the client through the communications device, wherein the downloaded program executes in the web browser and displays the electronic document in WYSIWYG form to the user, and at least one of the authoring tools has one or more functions that allows a user to select and edit at least one element of the electronic document while at least a portion of the electronic document is simultaneously displayed;
further wherein the authoring program is adapted to provide that the authoring tools create an electronic document and that the electronic document is uploaded to the server computer system in a form allowing a translation program to create the prepress format file so that when the prepress format file is used to produce a document the document is consistent with the WYSIWYG image displayed to the user on the client computer by the authoring program, and so that the user need not be concerned with creating a prepress format file.

35. The client computer of claim 34, wherein the computer-readable medium is selected from the group essentially comprising memory and a nonvolatile storage medium.

36. The client computer of claim 34, wherein the communications device is selected from the group essentially comprising a modem and a network card.

37. The client computer of claim 34, wherein the operating environment program comprises an Internet world-wide-web browser.

38. The client computer of claim 34, wherein the operating environment program comprises an intranet world-wide-browser program.

39. The client computer of claim 34, wherein the operating environment program comprises an extranet world-wide-browser program.

40. A server computer system comprising:

a processor;

a computer-readable medium;

a communications device;

an authoring program stored on the computer-readable medium for downloading through the communications device to a client computer and used by a client computer to create an electronic document, wherein the authoring program includes one or more document authoring tools and further wherein at least some of the authoring tools are adapted to create an electronic document;

wherein the downloadable authoring program is adapted to execute in a web browser of the client computer and display the electronic document in WYSIWYG form to the user of the client computer, and at least one of the authoring tools has one or more functions that allow a user to select and edit at least one element of the electronic document while at least a portion of the electronic document is simultaneously displayed;

the authoring program adapted to provide that the authoring tools create an electronic document and that the electronic document is uploaded to the server computer system in a form allowing a translation program to create the prepress format file so that when the prepress format file is used to produce a document the document is consistent with a WYSIWYG image displayed to the user on the client computer by the authoring program, and so that the user need not be concerned with creating a prepress format file.

41. The server computer system of claim 40, wherein the computer-readable medium is selected from the group essentially comprising memory and a nonvolatile storage medium.

42. The server computer system of claim 40, wherein the communications device is selected from the group essentially comprising a modem and a network card.

43. A computer-readable medium having a computer program stored thereon for downloading to a client computer from a server computer system and for execution on the client computer within the client's web browser, the program comprising means for creating a WYSIWYG document, which is uploaded from the client to the server through a communications device for translation to a suitable prepress format and submission to a printer.

44. A computer-readable medium having a computer program stored thereon for execution on a server computer system, the program comprising:

means downloadable from a server computer to a client computer for creating a WYSIWYG document in the client's web browser, and, means for translating the document to a suitable prepress format and for sending the document as translated to a printer through a communications device of the server computer system.

* * * * *

UNITED STATES PATENT AND TRADEMARK OFFICE
CERTIFICATE OF CORRECTION

PATENT NO. : 6,631,375 B2
DATED : October 7, 2003
INVENTOR(S) : Jecha et al.

It is certified that error appears in the above-identified patent and that said Letters Patent is hereby corrected as shown below:

Title page,
Item [54], Title, delete "ADMINISTRATION AND SEARCH AND REPLACE OF COMPUTERIZED PREPRESS" and replace with -- BROWSER-BASED COMPUTERIZED PREPRESS --.
Item [63], Related U.S. Application Data, delete "abandoned" and replace with -- Pat. No. 6,247,011 --.

Column 1,
Line 8, delete "abandoned" and replace with -- Pat. No. 6,247,011 --.

Column 11,
Line 6, delete "plate" and replace with -- palette --.

Signed and Sealed this

Tenth Day of May, 2005

JON W. DUDAS
*Director of the United States Patent and Trademark Office*

(12) EX PARTE REEXAMINATION CERTIFICATE (10286th)
United States Patent
Jecha et al.

(10) Number: US 6,631,375 C1
(45) Certificate Issued: *Sep. 3, 2014

(54) BROWSER-BASED COMPUTERIZED PREPRESS

(75) Inventors: Steven T. Jecha, Minneapolis, MN (US); Winfield A. Mitchell, Minneapolis, MN (US)

(73) Assignee: Digital-Net, Inc., South Minneapolis, MN (US)

Reexamination Request:
No. 90/009,296, Nov. 14, 2008
No. 90/009,313, Mar. 23, 2009

Reexamination Certificate for:
Patent No.: 6,631,375
Issued: Oct. 7, 2003
Appl. No.: 09/204,388
Filed: Dec. 2, 1998

Certificate of Correction issued May 10, 2005

( * ) Notice: This patent is subject to a terminal disclaimer.

Related U.S. Application Data

(63) Continuation-in-part of application No. 08/982,438, filed on Dec. 2, 1997, now Pat. No. 6,247,011.

(51) Int. Cl.
*G06F 17/21* (2006.01)
*G06F 17/24* (2006.01)

(52) U.S. Cl.
USPC ............... 715/249; 707/E17.009; 715/210

(58) Field of Classification Search
None
See application file for complete search history.

(56) References Cited

To view the complete listing of prior art documents cited during the proceedings for Reexamination Control Numbers 90/009,296 and 90/009,313, please refer to the USPTO's public Patent Application Information Retrieval (PAIR) system under the Display References tab.

*Primary Examiner* — William H Wood

(57) ABSTRACT

Computerized client/server prepress using a downloadable document authoring program. A server has stored thereon a document authoring program. The program is adapted to download to a client computer and run in the browser of the client computer. The authoring program allows the client to create an electronic document, view the document in WYSIWYG form, and upload the created document to the server for subsequent translation to a suitable prepress format.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-44 are cancelled.

\* \* \* \* \*